Figure 2:
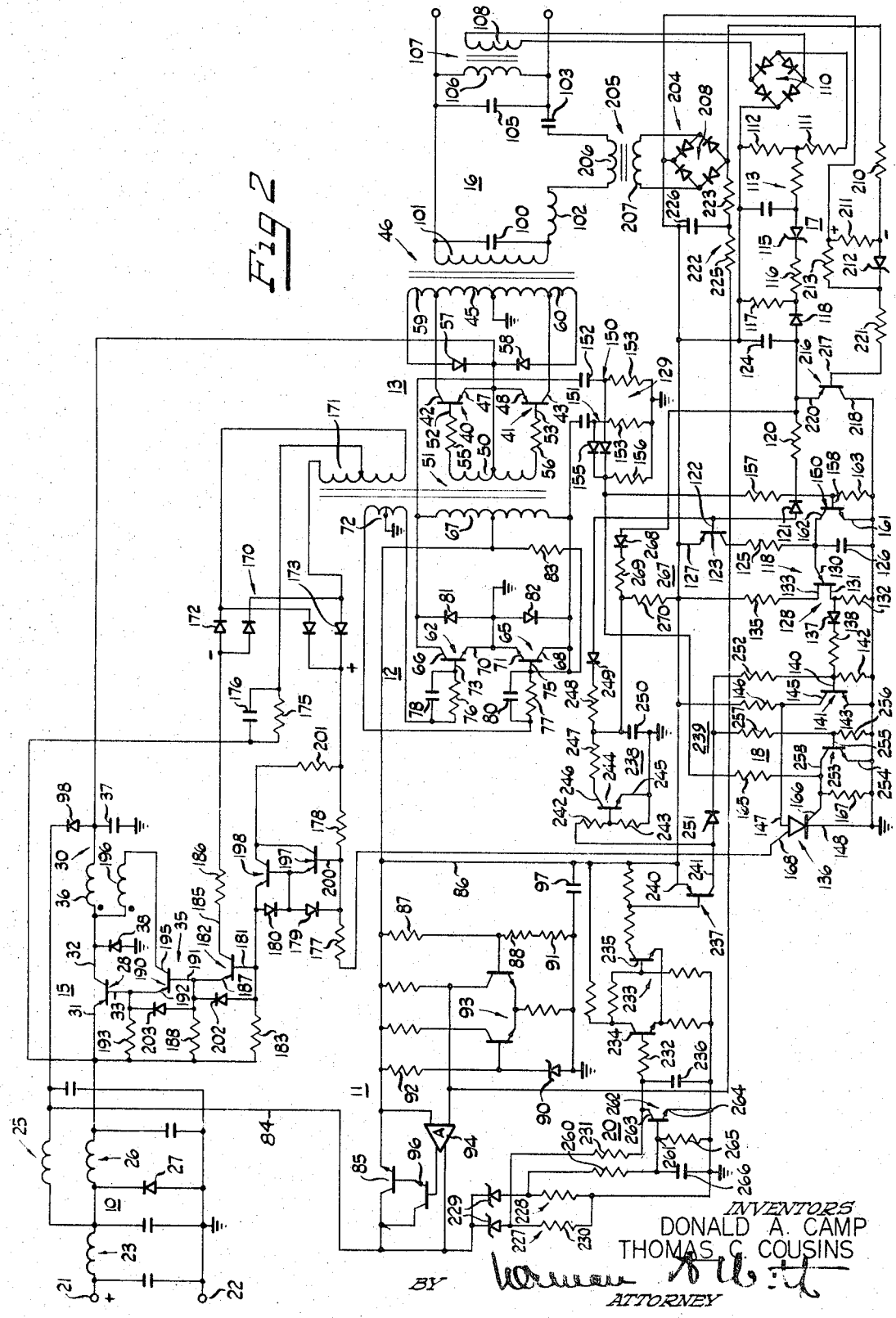

Jan. 23, 1968      D. A. CAMP ET AL      3,365,650
STATIC INVERTER HAVING A REGULATED OUTPUT
Filed Oct. 21, 1965      2 Sheets-Sheet 1
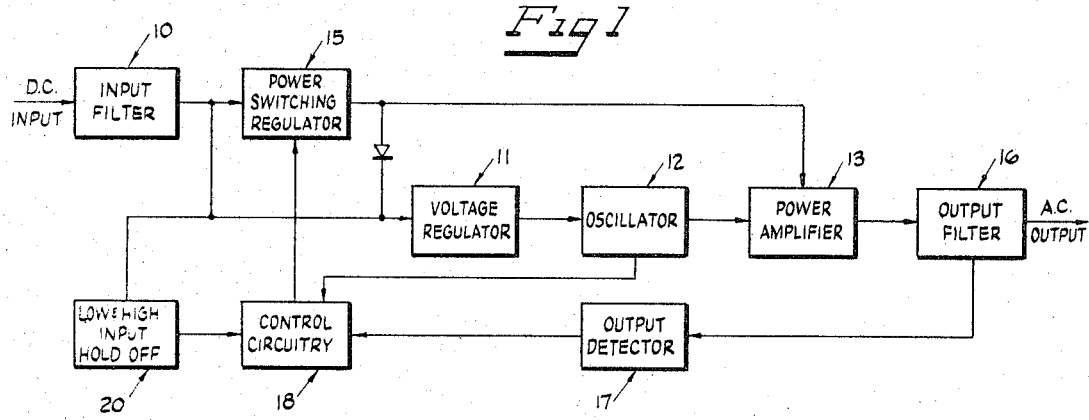
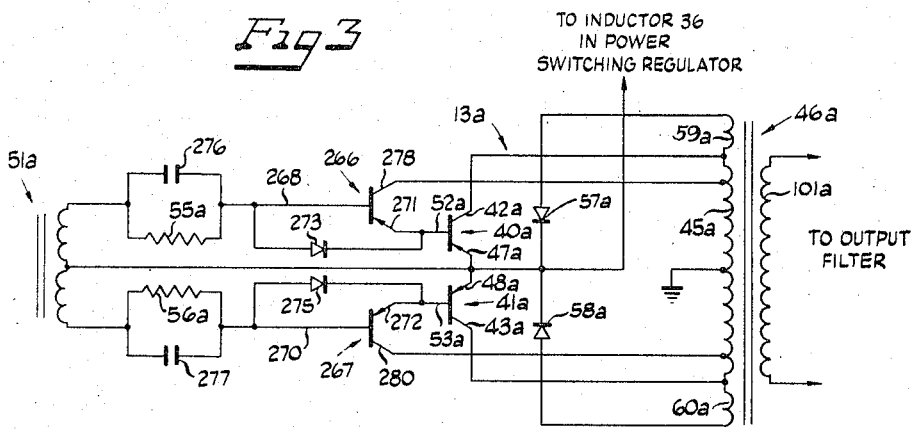
INVENTORS
DONALD A. CAMP
THOMAS C. COUSINS
BY
ATTORNEY

United States Patent Office 3,365,650
Patented Jan. 23, 1968

3,365,650
STATIC INVERTER HAVING A REGULATED OUTPUT
Donald A. Camp, Chicago, and Thomas C. Cousins, Arlington Heights, Ill., assignors to Vapor Corporation, Chicago, Ill., a corporation of Delaware
Filed Oct. 21, 1965, Ser. No. 499,586
12 Claims. (Cl. 321—18)

The present invention relates to static inverters and more particularly to an improved static inverter having a regulated output.

In certain applications only D-C power is provided or generated. This is especially true in applications, such as mobile applications, where the source of power is a battery. In other applications, D-C power is generated because of certain advantages in using D-C power. For example, in railroad diesel engines, D-C power is generated to drive the traction motors because of the ease of control of D-C motors as compared to A-C motors. However, in such applications there is often a need for A-C power to operate other devices such as small induction motors.

When such situations arise, inverters are required to convert the D-C energy to the required alternating current. Mechanical inverters, such as motor-generator sets, or static inverters, employing vacuum or solid state circuits, are usually used in such applications. Mechanical inverters have many disadvantages including low efficiency, bulkiness, weight problems and high frequency of breakdown.

To cure some of the disadvantages of the rotary-type inverters, static inverters were designed. Static inverters were first designed with vacuum tube circuits and later with solid state circuits. The use of solid state devices reduces the complexity, the size and, the weight of the power supply required which, in turn, permits a provision of a static power supply, which is small and light enough for easy transportation, and in which the heat production resulting from power consumption is low enough to permit efficient packaging of the supply.

Static inverters normally include an oscillator which operates at the desired output frequency and which is energized by the D-C power supply. For low power applications the output signal may be taken directly from the oscillator. However, for most applications, the oscillator is employed to control a power amplification stage. Most static inverters are also provided with means for regulating the output voltage thereof.

An object of the present invention is the provision of an improved static inverter. Another object of the invention is the provision of a static inverter which has a closely regulated output voltage. Still another object is the provision of a static inverter which is efficient in operation and durable in use.

Other objects and advantages of the present invention will become apparent by reference of the following description and accompanying drawings.

In the drawings:
FIGURE 1 is a block diagram of a static inverter showing features of the present invention;
FIGURE 2 is a circuit diagram of the static inverter shown in FIGURE 1; and
FIGURE 3 is a circuit diagram of another embodiment of a portion of the circuit shown in FIGURE 2.

Generally, the static inverter shown in the drawings includes an input filter 10 the input of which is connected to a source (not shown) of D-C power. The output of the input filter is connected through a voltage regulator 11 to an oscillator 12 which generates a square wave at a preselected frequency. The output of the oscillator 12 is amplified by a power amplifier 13 which receives D-C operating power from a power switching regulator 15 coupled to the input filter 10. The square wave output of the power amplifier 13 is converted into a sine wave by an output filter 16 coupled thereto. The output voltage of the static inverter is regulated by regulating the voltage supplied to the power amplifier 13. In this connection, the output voltage of the static inverter is sensed by an output detector 17 and, by control circuitry 18, the sensed voltage is employed to control the ratio of on time to off time of the power switching regulator 15. Means 20 is also provided for preventing operation of the power regulator 15 when the voltage applied to the static inverter by the D-C power supply is too low or too high for proper operation of the static inverter.

More specifically, the static inverter is designed to convert D-C power supplied by a D-C power source (not shown) such as a D-C generator, storage batteries, etc., into A-C power of a predetermined frequency and voltage. As shown in FIGURE 2, the power supply is connected to the static inverter by connecting positive and negative input terminals 21 and 22 of the static inverter respectively to the positive and negative outputs of the D-C power supply. As shown, the negative input terminal 22 of the static inverter is grounded, alternately, the positive terminal 21 may be grounded by suitable modifications of the circuit.

Spikes or excessive ripple which may be present in the power supplied by the power source are reduced by coupling in input tot he input filter 10. The input filter also serves to suppress high frequency noise reflected from the inverter back to the power supply. The filter 10 may be of a conventional low pass type and in the illustrated embodiment includes a pi capacitor input section 23 and two separate inductor input L sections 25 and 26 coupled to the output of the pi section 23. The static inverter is protected against the application of reverse polarity by a normally reversed biased diode 27 connected between ground and the positive output of the pi section 23.

As shown ind FIGURE 2, the filtered D-C output of one L section 26 of the filter 10 is applied to the input of the power switching regulator 15 which serves to regulate the output of the static inverter by increasing or decreasing the voltage supplied to the power amplifier 13. The power switching regulator 15 controls the voltage supplied to the power amplifier 13 by effectively switching the D-C power on and off, the ratio of on time to off time being varied to regulate the output of the inverter, and then filtering the resulting chopped D-C to provide a constant D-C voltage. In this connection, the illustrated power switching regulator 15 is of the series type in which a switching means 28 and a filter circuit 30 are connected in series with the output thereof. The switching means includes a p-n-p transistor (hereinafter referred to as the power switching transistor 28), the emitter 31 of which is connected to the positive D-C output of the filter 10 and the collector 32 of which is connected to the filter circuit 30. The base 33 of the transistor is coupled to a driving circuit 35, which as described hereinafter, controls the switching of the power switching transistor 28 to provide an output pulse having a controlled ratio of on time to off time.

The chopped D-C voltage is supplied to the filter circuit 30 which removes the A-C component from the chopped D-C to provide a relatively smooth D-C output voltage. The illustrated filter circuit 30 is an inductor input L section including a series inductor 36 and a shunt capacitor 37. In order to provide a path for the continued current flow through the inductor 36 during the off time of the power switching transistor 28, a normally reversed biased diode 38 is coupled between the input to the inductor 36 and ground.

The output of the power switching regulator 15 is supplied to the power amplifier 13 which converts the D-C voltage into a square wave of a predetermined frequency. In the embodiment illustrated in FIGURE 2, the power amplifier 13 includes a pair of p-n-p transistors 40 and 41 connected in a switching push-pull configuration. In this connection, the collectors 42 and 43 of the transistors 40 and 41 are connected to end connections of a center tapped primary winding 45 of an output transformer 46, (hereinafter referred to as the power transformer 46) the center tap of which primary winding is grounded. The emitters 47 and 48 of the transistors are connected to the output of the power switching regulator 15, and to the center tap of a secondary winding 50 of a transformer 51 (hereinafter referred to as the frequency transformer 51). The bases 52 and 53 of the transistors are connected through series base drive resistors 55 and 56 to the end connections of the secondary winding 50.

When a resistive load is connected across the output of the inverter, transistors 40 and 41 will conduct on alternate half cycles to supply current to the load. However, when a reactive load is connected to the output, it will attempt to return current to the source during each half cycle of operation. Diodes 57 and 58 are provided to bypass transistors 40 and 41 and return the reactive currents to the power switching regulator 15 where they are absorbed by capacitor 37. Diode 57 is connected between the emitter 47 of the transistor 40 and one end of auxiliary winding 59 on power transformer 46. The other end of the winding 56 is connected to that end of the primary winding 45 which, in turn, is connected to the collector 42 of transistor 40. Diode 58 and auxiliary winding 60 are connected in a similar manner between the emitter and collector of transistor 41.

The use of auxiliary windings 59 and 60 reduces the change in frequency which results from additional loading on oscillator 12 when diodes 57 and 58 are connected directly to the collectors of transistor 40 and 41. If the diodes were so connected, it would cause a positive collector to emitter voltage on the "on" transistor equal to the forward voltage drop of the conducting diode (57 or 58). Because of the diode action of the collector-base junction, the base of the transistor would also go positive with respect to the emitter. Since the base-emitter voltage is normally negative when the transistor is on, this higher base-emitter voltage places a heavier current demand on oscilaltor 12. Auxiliary windings 59 and 60 are designed to develop a voltage approximately equal to the forward voltage drop of diodes 57 and 58. With the auxiliary windings inserted between the diodes and the collectors of the transistors, the change in collector-emitter voltage is minimized and presence of a reactive load on this inverter will have little effect on frequency.

The power amplifier 13 is switched in response to the output from the oscillator 12 which operates at a desired output frequency. The illustrated oscillator 12 is a conventional saturable-core, square wave oscillator in which an n-p-n transistor 62 is coupled in a push-pull circuit with another n-p-n transistor 65. The collector 66 of transistor 62 is coupled to one end connection of a center tapped primary winding 67 of the frequency transformer 51 and the collector 68 of the other transistor 65 is coupled to the other end connection of the primary winding 67. The center tap of the primary winding 67 is connected to the positive output of the voltage regulator 11, described hereinafter. The emitters 70 and 71 of both transistors 62 and 65 are connected together and are grounded. A center tapped positive feed-back winding 72 is provided on the frequency transformer 51 and the center tap of this feed-back winding is grounded. The end connections of the feed-back winding 72 are respectively coupled to the bases 73 and 75 of the transistors 62 and 65 through separate parallelly connected base drive resistors 76 and 77 and capacitors 78 and 80. The transistors 62 and 65 are protected from inductive currents by diodes 81 and 82 connected between ground and the collectors 66 and 68 of the transistors. Starting of the oscillator 12 is insured by coupling a resistor 83 between the center tap of the primary winding and the base 75 of one of the transistors.

The oscillator 12 operates at a frequency determined by the number of turns of the primary of the frequency transformer 51, the saturation flux of the core of the transformer 51 and the D-C input or supply voltage. Therefore, to obtain a constant output frequency, a regulated D-C voltage is supplied to the oscillator 12 which regulated D-C voltage is provided by the voltage regulator 11. The illustrated voltage regulator is a series type in which a transistor regulating element 85 is placed in series with the output thereof. Regulation occurs as the result of varying the voltage drop across the series transistor 85. More specifically, the series transistor 85 is an n-p-n type coupled in an emitter follower configuration. The collector thereof is coupled to the output 84 of the L filter section 25 and the emitter thereof is coupled to a positive output conductor 86. The output voltage of the voltage regulator 11 is sensed by means of a pair of series resistors 87 and 88 connected between the output conductor 86 and ground, the voltage developed across one of the resistors being compared with a voltage reference 90 which, as illustrated, is a zener diode. Temperature compensation is provided by a sensistor 91 connected in series with the resistors 87 and 88. A series resistor 92 couples one side of the zener diode 90, which is grounded at the other side, to the positive output conductor 86 to pass current through the zener diode 90 in order to establish its reference voltage. Any difference in the voltage across the zener diode 90 and the sensing resistor 88 and the sensistor 91 is amplified by a conventional differential amplifier 93 and a transistor amplifier 94 and is coupled to the base of a driver transistor 96. The driver transistor 96 and the series transistor 85 are coupled together in a conventional Darlington circuit. A high frequency bypass capacitor 97 is coupled across the output of the voltage regulator 11. To insure that, the oscillator continues to receive power until the filter capacitor 37 on the power switching regulator 15 is discharged when the input power is disconnected, a diode 98 is coupled between the output of the power regulator 15 and the input to the voltage regulator 11.

As previously indicated, the output of the power amplifier 13 is a square wave. While the square wave can be employed for certain applications it is preferable to convert the square wave into a sine wave. In the illustrated embodiment this is accomplished by coupling the band pass filter 16 to the output of the power amplifier 13, which filter is designed to pass the frequency of the oscillator 12. The filter includes a shunt capacitor 100 connected across a secondary winding 101 of the output transformer 46, a serially connected inductor 102 and capacitor 103 connected in series with the load, and a parallelly connected capacitor 105 and the primary winding 106 of an inductor 107 coupled across the output of the filter. A secondary winding 108 is added so that the inductor 107 may also serve as a voltage sensing transformer (in lieu of a separate voltage sensing transformer).

The output voltage of the static inverter is regulated by controlling the ratio of on time of off time in the voltage regulator 15. The output detector 17 and the control circuitry 18 function to control this ratio. In the output detector 17, the output voltage of the filter 16 is sensed by the secondary winding 108 of the inductor 107. The sensed voltage is rectified by connecting the secondary winding 108 to a bridge diode circuit 110. The output of the bridge circuit 110 is coupled across a pair of series resistors 111 and 112, either of which may be selected (or adjusted) to provide the desired output voltage. The voltage developed across resistor 112 is filtered by an L type RC filter 113 and is applied across a series reference circuit including a zener diode 115 and two serially connected resistors 116 and 117. Thus, changes in sensed voltage cause corresponding changes in the voltage developed across the serially connected resistors 116 and 117.

The voltage developed across one of the serially connected resistors 116 and 117 is employed to control the width of pulses supplied by the control circuitry 18 to the power regulator 15. In the illustrated embodiment, the voltage developed across the one serially connected resistor 117 is coupled through a first steering diode 118, a series resistor 120, and a second steering diode 121 to the base 122 of a p-n-p transistor 123 (hereinafter referred to as the timing transistor 123). The resistor 120 in conjunction with capacitor 124 provides additional filtering for the control signal. During normal operation of the static inverter, the timing transistor 123 is biased toward cutoff by the hold off circuit 20 described hereinafter. The collector-emitter circuit of the timing transistor 123 is connected in series with a resistor 125 and a timing capacitor 126, the emitter 127 being connected to the positive output conductor 86 of the voltage regulator 11 and one side of the timing capacitor 126 being connected to ground.

The timing capacitor 126 is discharged twice each cycle of the oscillator 12 by a synchronizing circuit 129, described hereinafter. Thus, the time it takes for the charge on the timing capacitor 126 to build up to a selected level is controlled by the conduction of the timing transistor 123 which, in turn, is controlled by the voltage at the output of the static inverter. The width of the "on" pulse applied to the power switching regulator 15 is controlled by this timing. When the charge on the timing capacitor 126 builds up to the preselected level, it fires a unijunction transistor 128. The emitter 130 of the unijunction transistor 128 is connected to the junction of the series resistor 125 and the timing capacitor 126, one base 131 of the unijunction transistor 128 is connected through a load resistor 132 to ground, and the other base 133 is connected through a resistor 135 to the positive conductor 86.

The output pulse of the unijunction transistor 128 is employed to turn off a silicon controlled switch 136, which had previously been turned on by the synchronizing circuit 129, described hereinafter. In this connection, the output of the unijunction transistor 128 is coupled through a steering diode 137 and a base drive resistor 138 to the base 140 of a transistor 141 (hereinafter referred to as the turn off transistor 141). During normal input voltage operation of the static inverter, the turn off transistor is biased to cutoff by the low and high level hold off circuit 20, described hereinafter. A resistor 142 is connected between the base 140 of the turn-off transistor 141 and ground for the purpose of biasing the transistor "off" when no signal is present at its base. The emitter 143 of the turn-off transistor 141 is also grounded and the collector 145 thereof is connected to the anode 147 of the silicon controlled switch 136.

Firing of the unijunction transistor 128 causes the turn-off transistor 141 to be momentarily driven into saturation which, in turn, causes the silicon controlled switch 136 to be turned off. In this connection, the anode 147 of the silicon controlled switch 136 is connected through resistor 146 to the positive conductor 86 in order to provide the switch with "holding current" when it is in its "on" state. The cathode 148 of the silicon controlled switch 136 is connected to ground. Thus, when the turn-off transistor 141 is in its saturated condition, it effectively shunts the "holding current" from the anode-cathode circuit of the silicon controlled switch 136 and thereby turns the switch off.

In the illustrated embodiment, the timing capacitor 126 is discharged and the silicon controlled switch 136 is turned on twice each cycle (or at the beginning of each half cycle) of the oscillator 12 by the synchronizing circuit 129. The synchronizing circuit 129 includes two differentiators 150 and 151 which are coupled to respectively receive alternate half cycles from the oscillator 12. In this connection, the end connections of the primary winding 67 of the frequency transformer 51 are respectively connected to the differentiator circuits 150 and 151, each of which includes a series capacitor 152, a shunt resistor 153 and a series diode 155. Only the positive spikes developed across the resistors 153 are coupled to the remainder of the circuit, the negative spikes being blocked by means of diodes 155. The positive spikes passing through the two diodes are combined by connecting the diodes 155 to ground through a common resistor 156.

The combined output is coupled through a series resistor 157 to the base 158 of a transistor 160, the collector emitter circuit of which shunts the timing capacitor 126 upon the transistor receiving a positive spike. Thus, the timing capacitor is fully discharged at the beginning of each half cycle of the oscillator frequency. The transistor 160 is an n-p-n transistor coupled in a common emitter configuration and normally biased to cut off by means of resistor 163 connected between its base 158 and ground. The emitter 161 of the transistor 160 is grounded and the collector 162 is connected to the junction of the timing capacitor 126 and the series resistor 125.

The output of the synchronizing circuit 129 is also coupled through a series resistor 165 to the cathod gate 166 of the silicon controlled switch. A resistor 167 is connected between the cathode gate 166 and ground. Thus, at the beginning of each half cycle of operation, the silicon controlled switch 136 is turned on. The silicon controlled switch 136 remains on until it is turned off by the firing of the unijunction transistor 128, which is fired at a time after the beginning of the half cycle controlled by the output voltage of the static inverter. Hence, the anode 147 and the anode gate 168 of the silicon controlled switch 136 are turned on twice each cycle, the duration of the on time being controlled by the output voltage of the static inverter. (In the present usage, the anode is used to supply "holding current" to the silicon controlled switch while the anode gate is used to control the next stage).

As shown in FIGURE 2, the anode gate 168 of the silicon controlled switch 136 is connected to the driver circuit 35 of the power switching regulator 15 and this circuit is arranged so that the power switching transistor 28 is turned on when the anode gate 168 is turned on and turned off when the anode gate 168 is turned off. In this connection, the power switching transistor 28 is turned off by coupling the base 33 thereof to a D-C voltage which biases the base 33 positive with respect to the emitter 31 and is turned on by coupling the base 33 to a D-C voltage which biases the base 33 negatively with respect to the emitter.

The negative and positive voltages are supplied by a low voltage power source 170, which obtains its power from a center tapped tertiary winding 171 on the frequency transformer 51. Two full wave rectifiers 172 and 173 are respectively connected to the end connections, one of which provides a negative voltage with respect to the center tap and the other of which provides a positive voltage. The center tap of the secondary windings 171 is connected through parallelly connected resistor 175 and capacitor 176 to the emitter 31 of the power switching transistor 28.

The negative voltage is applied to the base of the power switching transistor 28 in response to the anode gate 168 being turned on. In this connection, the anode gate 168 is connected through serially connected resistor 177 and diodes 179 and 180 to the base 181 of a p-n-p transistor 182 which acts as an amplifier. The collector 185 thereof is coupled through a collector resistor 186 to the negative voltage of the power supply 170. The transistor 182, which had been biased to cut off by a circuit described hereinafter, is driven to saturation by the anode gate 168 being turned on. The transistor 182 drives a p-n-p driver transistor 190 which is directly coupled to the power switching transistor. More specifically, the base 191 of the driver transistor 190 is coupled to the emitter 187 of the transistor 182 and the emitter 192 thereof is coupled to the base 33 of the power switching transistor 28.

The collector 195 of the driver transistor 190 is coupled to the collector 32 of the power switching transistor 28 through means 196 for permitting the power switching transistor 28 to be driven into saturation thereby reducing the power dissipation therein. Without such a means 196, the power switching transistor 28 would not be driven into saturation. In this connection, the collector-emitter voltage of the power switching transistor 28 is equal to the sum of the base-emitter voltage of the power switching transistor plus the collector-emitter voltage of the driver transistor 190.

Without the saturation permitting means 196, the collector-emitter voltage is greater than the saturation collector-emitter voltage of the power switching transistor 28. In the illustrated embodiment, the saturation permitting means 196 includes a winding, which is in inductive relationship with the series inductor 36, and is coupled between the collector 32 of the power switching transistor and the collector 195 of the driver transistor 190. The winding 196 is wound so that, by transformer action, the voltage induced in the winding by current in the inductor 36 subtracts from the aforementioned sum, thereby permitting the power switching transistor 28 to be driven into saturation. The saturation permitting means 196 may also be provided by connecting the collector 195 to a tap intermediate the ends of the series inductor. Another, but less efficient means of permitting the power switching transistor 28 to be driven into saturation would be to insert a voltage dropping means in its collector 32 and to connect collector 195 directly to the junction of the voltage dropping means and inductor 36.

The power switching transistor 28 is turned off by applying a positive voltage to the base 33 thereof in response to the anode gate 168 being turned off. More specifically, the turn off of the anode gate 168 causes the current in resistor 177 to go to zero and thereby removes the drive current to transistors 182, 190 and 28. In addition, the absence of current in resistor 177 permits two n-p-n Darlington connected transistors 197 and 198 to turn on and supply positive voltage to the bases of transistors 182, 190, and 28, thus assuring positive turn-off of the latter. In this connection, a drive resistor 178 is connected between the positive voltage of the power supply 170 and the base 200 of the input or driver transistor 197. The base 200 is also coupled to the junction of the resistor 177 and diode 179 so that transistor 197 may be biased off when the anode gate 168 is on. The base of transistor 198 is connected to the junction of diodes 179 and 180 for the same purpose. The collector emitter circuit of the output transistor 198 of the Darlington circuit is connected in series with a collector load resistor 201 and together they are connected between the base 181 of transistor 182 and the positive output of the power supply 170. Thus, when the anode gate 168 is off, a positive voltage is applied to the base 181 of transistor 182 driving it to cut off. This voltage is coupled to the base 33 of the power switching transistor 28 by means of serially connected diodes 202 and 203, to thereby drive the power switching transistor 28 into cut off. The base 191 of the driver transistor 190 is connected to the connection between the diodes 202 and 203, and therefore the driver transistor 190 is also driven to cut off.

Bases 181, 191, and 33 of transistors 182, 190 and 28, respectively, are connected through bias resistors 183, 188 and 193, respectively, to the emitter 31 of transistor 28 so that, at very low input voltages to the inverter, when power supply 170 is insufficient or "not yet operative" the subject transistors may be safely biased off.

As previously indicated, the ratio of the on-off time of the power switching transistor 28 controls the output voltage of the inverter. This ratio of on time to off time is varied in accordance with variations in the output voltage of the inverter.

In the illustrated embodiment, means 204 is provided for limiting the current output of the static inverter to a selected level. In this connection, the current limiting means 204 senses the output current and, if the output current exceeds a preselected level, the means 204 is coupled into the control circuitry so as to control the timing of the charge build up on the timing capacitor 126. As shown in FIGURE 2, the current limiting means 204 includes a transformer 205, the primary 206 of which is connected either in series with the output of the static inverter or, as in the present embodiment, in series with the serially connected elements 102 and 103 of the output filter 16. The secondary 207 of the transformer 205 is connected to a bridge rectifier 208. The output of the bridge rectifier 208 is coupled across a pair of serially connected resistors 210 and 211, either one of which may be selected or adjusted to provide the desired maximum output current level. Thus the sensed A-C current is converted to a full-wave rectified current across resistors 210 and 211. A serially connected zener diode 212 and a resistor 213 are connected across resistor 211, and the junction of the resistor 211 and the resistor 213 is connected to the positive conductor 86. The sensed voltage across resistor 211 which exceeds the break down voltage of the zener diode 212 will appear across resistor 213. This voltage is coupled through a resistor 221 to an amplifier 216 which is coupled to the input of the timing transistor 123. As shown in FIGURE 2, the amplifier 216 is a p-n-p transistor coupled as an emitter follower. The base 217 of the transistor 216 is connected to the resistor 221, collector 218 thereof is connected to ground, and the emitter 220 thereof is connected to the junction between the first steering diode 118 and the series resistor 120. During voltage regulation of the static inverter, the amplifier transistor 216 is biased to cut off by means of resistors 221 and 213. But, when excess load current is present, the current feedback signal overrides the voltage signal and takes over control of the regulation.

The current limiting means 204 is also provided with means 222 for compensating for the effect of load changes on the frequency. As the load on the static inverter increases, the base to emitter voltage on the transistors 40 and 41 of the power amplifier 13 increases which results in a decrease in the base current of the transistors 40 and 41. This provides a smaller load on the input transformer 51 which tends to increase the frequency of the oscillator 12. The compensating means 222 is arranged to reduce the D-C voltage to the oscillator 12 as the inverter (or output) load increases. More specifically, the voltage developed across the bridge circuit 208 of the current limiting means 204 is coupled through a resistor 223 and a series resistor 225 to the input of the amplifier 94 in the voltage regulator 11. A high frequency bypass capacitor 226 is coupled to the junction of the resistor 223 and the resistor 225 and to the positive conductor 86. Therefore, the output of the voltage regulator 11 and hence the D-C voltage supplied to the oscillator 12 is varied in accordance with the load.

The illustrated static inverter is also provided with the hold off circuit 20, which prevents operation thereof when the input voltage applied thereto is either too low or too high for proper operation of the static inverter. When the input voltage is outside the normal range, the circuit 20 is arranged to (one) cause the timing capacitor to charge up very rapidly and to (two) cause the silicon controlled switch 136 to turn off and remain turned off. In the illustrated hold off circuit 20, the voltage input to the static inverter is sensed by connecting a low voltage sensing circuit 227 and a high voltage sensing circuit 228 in parallel between the positive input voltage line 84 to the voltage regulator 11 and ground. Each sensing circuit 227, 228 includes a zener diode 229 and a resistor 230 connected in series between the positive input voltage line 84 and ground. The interconnection between the zener diode 229 and the series resistor 230 of the low voltage sensing circuit 227 is connected through two serially connected resistors 231 and 232 to the input of a bi-stable multivibrator 233 which in the illustrated embodiment includes two n-p-n transistors 234 and 235 coupled as a conventional Schmitt trigger circuit. For lower than normal input voltages to the static inverter, the input transistor 234 is off and the output transistor 235 is on. A high frequency bypass capacitor 236 is connected to the interconnection of the two serially connected resistors 231 and 232. The output of the Schmitt trigger circuit 233 is coupled to a p-n-p transistor 237 (hereinafter referred to as the hold-off transistor 237) the collector-emitter circuit of which is connected in series with two parallel circuits 238 and 239, one of which controls the operation of the timing capacitor 126, and the other of which controls the operation of the silicon controlled rectifier 136.

More specifically, the hold-off transistor 237 is a p-n-p type which is turned on when the input voltage is below the normal range or, as will be described later, is above the normal range. The emitter 240 of the hold-off transistor 237 is connected to the positive conductor 86 and the collector 241 is connected to the two circuits 238 and 239. The timing capacitor control circuit 238 includes a pair of serially connected resistors 242 and 243 connected between the collector 241 and ground. The interconnection between the serially connected resistors 242 and 243 is connected to the base of an n-p-n transistor 244 which, during below normal voltage operation of the static inverter, is turned on. The emitter 245 of this transistor 244 is connected to ground and the collector 246 thereof is connected through two serially connected resistors 247 and 248 and a steering diode 249 to the base of the timing transistor 123. A capacitor 250 is connected between the junction of the serially connected resistors 247 and 248 and ground. Thus, during below normal voltage operation of the static inverter the forward bias on the timing transistor 123 is increased. Thus, the timing capacitor 126 becomes charged up more quickly and the "on time" signal is reduced to a very short duration. However, when the input voltage increases into the normal voltage range, the Schmitt trigger circuit 233 is switched, thereby turning off transistor 237 which, in turn, turns off the transistor 244. Transistor 244 will turn off quickly, but capacitor 250 causes the timing transistor 123 to return to its normal regulation region slowly so as to preclude any system instability or failure which may result from a rapid change in the state of the timing transistor 123.

Now the primary purpose of the timing capacitor control circuit 238 is to reduce the "on time" of the "timing circuit" to a small amount and to control the transition from "hold off" to normal regulation so that this transition does not occur too rapidly. This circuit 238 cannot reduce the "on time" to zero which would completely "hold off" the inverter. The silicon controlled switch control circuit 239 must be employed for this purpose.

The silicon controlled switch control circuit 239 includes a steering diode 251 and a series resistor 252 connected between the collector 241 of the hold off transistor 237 and the base 140 of the turn off transistor 141. During below normal voltage operation, since the hold off transistor 237 is turned on, the turn off transistor 141 is turned on, thereby turning off the silicon controlled switch 136. However, when the hold off transistor is turned off by an increase in voltage to the normal range, the turn off transistor 141 is turned off, thereby permitting normal operation of the silicon controlled switch 136.

The silicon controlled switch control circuit 239 also includes a transistor 253 which serves to by-pass the cathode gate 166 (or which serves to shunt the synchronization signal from circuit 129 so that the signal cannot gate on controlled switch 136) during below normal voltage operation of the static inverter. This by-pass transistor 253 is an n-p-n type in which the emitter 254 is connected to ground, the base 255 thereof is connected through a resistor 256 to ground and through a series resistor 257 to the steering diode 251, and the collector 258 is connected to the cathode gate 166. During below normal operation this by-pass transistor 252 is turned on thereby effectively grounding the cathode gate 166. When the input voltage increases to the normal range, this bypass transistor 252 is biased to cut off by means of resistor 256.

As shown in FIGURE 2, the high voltage sensing circuit 228 is connected to the Schmitt trigger circuit 233 so as to switch the same as its initial (low input voltage) mode of operation when the input voltage to the static inverter exceeds the normal range. In this connection, the junction between the zener diode 229 and the series resistor 230 of the high voltage sensing circuit 228 is connected through a series resistor 260 to the base 261 of an n-p-n transistor 262. The transistor 262 is normally turned off but, when a signal is supplied thereto by the high voltage sensing circuit 228, it is turned on to thereby shunt the input signal to the Schmitt trigger circuit 233. More specifically, the collector 263 of the transistor 262 is connected to the interconnection between the two series resistors 231 and 232 and the emitter 264 is connected to ground. A resistor 265 and a high frequency by pass capacitor 266 are connected between the base 261 and ground.

A circuit 267 is included in the hold off circuit 20 to permit the inverter to turn on and come into regulation faster. Initially there is no voltage across the capacitor 250. On turn on of the inverter current flows through the capacitor 124 through a steering diode 268, a series resistor 269, and the capacitor 250. Thus, capacitor 250 is charged up sooner, permitting the faster start up of the inverter. A resistor 270 is connected between the capacitor 250 and the positive conductor 86 to supply leakage current to capacitor 250 during normal operation of the inverter. Thus, the capacitor 250 has no effect during normal operation.

In operation of the static inverter, the D-C power supply is connected to the input terminals 21 and 22. When this input voltage is first applied, the voltage regulator 11 is energized thereby energizing the hold off circuit 20, the control circuitry 18, and the oscillator 12. The power switching regulator 15 is maintained in its off condition by the hold off circuit 20. In this connection, the hold off circuit 20 keeps the silicon controlled switch 136 turned off, and hence full cut off bias is applied to the power switching transistor 28 in the power switching regulator 15. When the input voltage builds up to the normal operating range, the hold off circuit 20 conditions the control circuitry 18 for normal operation. If the input voltage exceeds the normal range, the hold off circuit 20 turns off the silicon controlled switch 136 and a cut off bias is applied to the power switching transistor 28. When the input voltage is in the normal range, the power switching transistor 28 is turned on twice each cycle of the oscillator 12 for a controlled duration to regulate the output of the power amplifier 13. The duration time is controlled by the output detector through the medium of the control circuitry 18. If the output current exceeds a preselected level, the output current sensing circuit 204 takes over the control of the power switching transistor 28 and limits the output current. The current sensing circuit 204 also controls the output voltage of the voltage regulator 11 in order to minimize the effects of load variations on the frequency of the static inverter.

FIGURE 3 shows another embodiment of the power amplifier 13 wherein parts similar to those shown in the power amplifier of FIGURE 2 are indicated with the same reference numeral with the subscript $a$. In this embodiment driver transistors 266 and 267 are provided for respectively driving the transistors 40a and 41a of the power amplifier 13a. The driver transistors 266 and 267 and the driven transistors 40a and 41a are of the p-n-p type and are coupled in an improved Darlington circuit. More specifically, the base drive resistors 55a and 56a are respectively connected to the bases 268 and 270 of the driver transistors 266 and 267. The emitters 271 and 272 of the driver transistors 266 and 267 are connected to the bases 52a and 53a of the driven transistors 40a and 41a. Diodes 273 and 275 are respectively connected between bases 268 and 270 of the driver transistors 266 and 267 and the bases 52a and 53a of the driven transistors 40a and 41a to speed up the turn off of the driven transistors and to reverse bias the base emitter junctions of the driven transistors, hence reducing their leakage currents. Also, to speed up the switching, capacitors 276 and 277 are respectively connected in parallel with the base drive resistors 55a and 56a.

So that the driver transistors 40a and 41a can be driven into saturation and thereby improve the efficiency of the power amplifier 13a, the voltage at the collectors 278 and 280 of the driver transistors 266 and 267 is decreased with respect to that at the collectors 42a and 43a of the driven transistors. In this connection, the collectors 278 and 280 are connected to taps on the primary 45a of the output transformer 46a which are intermediate the collector connections of the driven transistors 40a and 41a and the center tap.

As can be seen from the above, an improved static inverter is provided in which substantially all of the semiconductor devices are operated in a switched or saturated mode. This reduces losses and heat effects to a minimum. Hence, the static inverter is very efficient and can be packaged in a small volume. Also, the output voltage of the static inverter is regulated by a power switching regulator connected between the input and the power amplifier. This permits wider input voltage variations and reduces output filtering problems. Moreover, the static inverter is protected from high output currents and low and high input voltages. Also, the static inverter provides a substantially constant frequency output even if load variations are encountered.

It should be realized that various changes may be made in the above described static inverter without deviating from the scope of the present invention. For example, in certain applications, the input of the voltage regulator may be connected to the output of the power regulator. If this is done, a by-pass circuit should be provided to provide operating voltage to the voltage regulator when the power regulator is turned off. Also, for certain applications wherein it is not necessary to provide a constant frequency and power requirements are small, the output may be taken directly from the oscillator thereby eliminating the power amplifier and the voltage regulator. Of course, p-n-p transistor circuits may be substituted for the n-p-n circuits and vice versa.

Various features of the invention are set forth in the accompanying claims.

What is claimed is:

1. A static inverter comprising D-C input circuit means for providing a D-C input signal, A-C output circuit means, power switching regulator means connected with said D-C input circuit means and including switching means therein operable for switching on and off the D-C input signal from said D-C input circuit means, and filter means converting said switched input into a D-C output signal, means connected with the output of said power switching regulator means for converting the output signal thereof into a square wave signal, said converting means being connected with said A-C output circuit means, means for detecting the output voltage of said A-C output circuit means, control means for receiving signals from said detecting means and providing a pulse control signal having a ratio of on time to off time which varies in accordance with variation in the output voltage, means coupling said control signal to said switching means, the switching means being operated in accordance with said control signal, and means responsive to the D-C input signal and coupled to said switching means for maintaining said switching means in its off condition when the D-C input signal is below a preselected level and above a preselected level.

2. A static inverter comprising D-C input circuit means for providing a D-C input signal, A-C output circuit means, power switching regulator means connected with said D-C input circuit means and including switching means therein operable for switching on and off the D-C input signal from said D-C input circuit means, and filter means converting said switched input into a D-C output signal, said filter means including a series inductor, said switching means including a pair of transistors, each having a base, an emitter and a collector, the emitter of one transistor being coupled to said input circuit means, the base of said one transistor being coupled to the emitter of said other transistor, the collector of said one transistor being coupled to said series inductor, and means coupling the collector of said other transistor to said inductor and including inductive means for reducing the voltage at the collector of said one transistor with respect to the voltage at the collector of said other transistor, means connected with the output of said power swiching regulator means for converting the output signal thereof into a square signal, said converting means being connected with said A-C output circuit means, means for detecting the output voltage of said A-C output circuit means, control means for receiving signals from said detecting means and providing a pulse control signal having a ratio of on time to off time which varies in accordance with the variation in the output voltage, and means coupling said control signal to the base of said other transistor, the switching means being operated in accordance with said control signal.

3. A static inverter comprising a D-C input circuit means for providing a D-C input signal, A-C output circuit means, power switching regulator means connected said D-C input circuit means and including switching means therein operable for switching on and off the D-C input signal from said D-C input circuit means, and filter means converting said switched input into a D-C output signal, said filter means including a series inductor, said switching means including a first and a second transistor, each having a base, an emitter, and a collector, the emitter of said first transistor being coupled to said input circuit means, the base of said first transistor being coupled to the emitter of said second transistor, the collector of said first transistor being coupled to said series inductor, a winding having one end connected to the collector of said first transistor and the other end connected to the collector of the second transistor and being in inductive relation with said series inductor, the winding being wound relative to the inductor so as to reduce the voltage at the collector of the first transistor with respect to the voltage at the collector of the second transistor, means connected with the output of said power switching regulator means for converting the output signal thereof into a square wave signal, said converting means being connected with said A-C output circuit means, means for detecting the output voltage of said A-C output circuit means, control means for receiving signals from said detecting means and providing a pulse control signal having a ratio of on time to off time which varies in accordance with variation in the output voltage, and means coupling said control signal to the base of said second transistor, the switching means being operated in accordance with said control signal.

4. A static inverter comprising D-C input circuit means for providing a D-C input signal, a A-C output circuit means, power switching regulator means connected with said D-C input circuit means and including switching means therein operable for switching on and off the D-C input signal from said D-C input circuit means, and filter means converting said switched input into a D-C output signal, means connected with the output of said power switching regulator means for converting the output signal thereof into a square wave signal, said converting means being connected with said A-C output circuit means, said converting means including a saturated mode oscillator and a saturated mode power amplifier means coupled to said oscillator for amplifying the output of said oscillator, said power switching regulator supplying power to said power amplifier means, means for detecting the output voltage of said A-C output circuit means, control means for receiving signals from said detecting means and providing a pulse control signal having a ratio of on time to off time which varies in accordance with variation in the output voltage, means coupling said control signal to said switching means, the switching means being operated in accordance with said control signal, and means responsive to the D-C input signal and coupled to said switching means for maintaining said switching means in its off condition when the D-C input signal is below a preselected level and above a preselected level.

5. A static inverter comprising D-C input circuit means for providing a D-C input signal, A-C output circuit means, power switching regulator means connected with said D-C input circuit means and including switching means therein operable for switching on and off the D-C input signal from said D-C input circuit means, and filter means converting said switched input into a D-C output signal, means connected with the output of said power switching regulator means for converting the output signal thereof into a square wave signal, said converting means being connected with said A-C output circuit means, said converting means including a saturated mode oscillator and a saturated mode power amplifier means coupled to said oscillator for amplifying the output of said oscillator, said power switching regulator supplying power to said power amplifier means, said power amplifier means including a pair of transistors having their emitters connected together, an input transformer an output transformer, the transformer and transistors being coupled in a push-pull saturated mode configuration, an additional winding on each end of said output transformer, and a diode connected between each additional winding and the connection between said emitters, said oscillator being coupled to the input transformer and said output transformer being coupled to the A-C output circuit means, means for detecting the output voltage of said A-C output circuit means, control means for receiving signals from said detecting means and providing a pulse control signal having a ratio of on time to off time which varies in accordance with variation in the output voltage, means coupling said control signal to said switching means, the switching means being operated in accordance with said control signal, and means responsive to the D-C input signal and coupled to said switching means for maintaining said switching means in its off condition when the D-C input signal is below a preselected level and above a preselected level.

6. A static inverter comprising D-C input circuit means for providing a D-C input signal, A-C output circuit means, power switching regulator means connected with said D-C input circuit means and including switching means therein operable for switching on and off the D-C input signal from said D-C input circuit means, and filter means converting said switched input into a D-C output signal, means connected with the output of said power switching regulator means for converting the output signal thereof into a square wave signal, said converting means being connected with said A-C output circuit means, said converting means including a saturated mode oscillator and a saturated mode power amplifier means coupled to said oscillator for amplifying the output of said oscillator, said power switching regulator supplying power to said power amplifier means, said power amplifier including a pair of driven transistors having their emitters connected together, a center tapped output transformer having its end connections connected to the respective collectors of the pair of driven transistors, a pair of driver transistors having their emitters connected to the respective bases of the driven transistors, and a center tapped input transformer having its end connections coupled to the respective bases of the driver transistors, the collectors of the driver transistors being coupled respectively to taps intermediate the end connections and the center tap of the output transformer, said input transformer being coupled to said oscillator and said output transformer being coupled to said A-C output circuit means, means for detecting the output voltage of said A-C output circuit means, control means for receiving signals from said detecting means and providing a pulse control signal having a ratio of on time to off time which varies in accordance with variation in the output voltage, means coupling said control signal to said switching means, the switching means being operated in accordance with said control signal, and means responsive to the D-C input signal and coupled to said switching means for maintaining said switching means in its off condition when the D-C input signal is below a preselected level and above a preselected level.

7. A static inverter comprising D-C input circuit means for providing a D-C input signal, A-C output circuit means, power switching regulator means connected with said D-C input circuit means and including switching means therein operable for switching on and off the D-C output signal from said D-C input circuit means, and filter means converting said switched input into a D-C output signal, means connected with the output of said power switching regulator means and having its output connected with said A-C output circuit means for converting the output of power switching regulator into a square wave signal, voltage control means having two modes of operation, means responsive to the square wave signal and coupled to said voltage control means for causing the same to switch into one mode of operation at the beginning of each half cycle of the square wave signal thereof, output detector means responsive to the output voltage of said A-C output circuit means and coupled to said voltage control means for causing the same to be switched into its other mode of operation during said half cycle after a time interval which is a function of the output voltage, means coupling the output of said voltage control means to said switching means, the switching means being operated in accordance with said output, and means responsive to the D-C input signal and coupled to said voltage control means for maintaining said voltage control means in its mode of operation which causes said switching means to be turned off when the D-C input signal is below a preselected level and above a preselected level.

8. A static inverter comprising D-C input circuit means for providing a D-C input signal, A-C output circuit means, power switching regulator means connected with said D-C input circuit means and including switching means therein operable for switching on and off the D-C output signal from said D-C input circuit means, and filter means converting said switched input into a D-C output signal, means connected with the output of said power switching regulator means and having its output connected with said A-C output circuit means for converting the output of power switching regulator into a square wave signal, voltage control means having two modes of operation, means responsive to the square wave signal and coupled to said voltage control means for causing the same to switch into one mode of operation at the beginning of each half cycle of the square wave signal, output detector means responsive to the output voltage of said A-C output circuit means and coupled to said voltage control means for causing the same to be switched into its other mode of operation during each half cycle after a time interval which is a function of the output voltage, and means coupling the output of said voltage control means to said switching means, the switching means being operated in accordance with said output.

9. A static inverter comprising D-C input circuit means for providing a D-C input signal, A-C output circuit means, power switching regulator means connected with said D-C input circuit means and including switching means therein operable for switching on and off the D-C output signal from said D-C input circuit means, and filter means converting said switched input into a D-C output signal, means connected with the output of said power switching regulator means and having its output connected with said A-C output circuit means for converting the output of power switching regulator into a square wave signal, voltage control means including a silicon controlled switch, means responsive to the square wave signal and coupled to said silicon controlled switch for causing the same to be switched into its conductive mode of operation at the beginning of each half cycle of the square wave signal, output detector means responsive to the output voltage of said A-C output circuit means and coupled to said silicon controlled switch for causing the same to be switched into its nonconductive mode of operation during said half cycle after a time interval which is a function of the output voltage, and means responsive to the operation of said silicon controlled switch and coupled to said switching means for causing the same to be operated in accordance with the mode of operation of said silicon controlled switch.

10. A static inverter comprising input circuit means for providing a D-C input signal, A-C output circuit means, power switching regulator means connected with said D-C input circuit means and including switching means therein operable for switching on and off a D-C input signal from said D-C input circuit means and filter means converting said switched input into a D-C output signal, means connected with the output of said power switching regulator means for converting the output signal thereof into a square wave signal, said converting means being connected with said A-C output circuit means, said converting means including a saturated mode oscillator, the frequency of which is responsive to D-C operating voltage applied thereto, and a saturated mode power amplifier means coupled to said oscillator for amplifying the output of said oscillator, said power switching regulator supplying power to said power amplifier means, a voltage regulator having its input coupled to said D-C input circuit means and its output coupled to said oscillator for providing a constant D-C operating voltage to said oscillator, means for detecting the output current of said A-C output circuit means, means for coupling the output of said current detecting means to the voltage regulator for varying the output voltage of said regulator in accordance with changes in the output current to thereby maintain the frequency of said oscillator approximately constant with changes in output current, means for detecting the output voltage of said A-C output circuit means, control means for receiving signals from said voltage detecting means and providing a pulse control signal having a ratio of on time to off time which varies in accordance with variation in the output voltage, and means coupling said control signal to said switching means, the switching means being operated in accordance with said control signal to thereby maintain the output voltage aproximately constant.

11. A static inverter comprising D-C input circuit means for providing a D-C input signal, A-C output circuit means, power switching regulator means connected with said D-C input circuit means and including switching means therein operable for switching on and off the D-C input signal from said D-C input circuit means and filter means converting said switched input into a D-C output signal, said filter means including a series inductor, said switching means including a first and a second transistor, each having a base, an emitter, and a collector, the emitter of said first transistor being coupled to said input circuit means, the base of said first transistor being coupled to the emitter of said second transistor, the collector of said first transistor being coupled to said series inductor, and means coupling the collector of said second transistor to said inductor and including inductive means for reducing the voltage at the collector of said first transistor with respect to the voltage at the collector of said second transistor, means connected with the output of said power switching regulator for converting the output signal thereof into a square wave signal, said converting means being connected with said A-C output circuit means, said converting means including a saturated mode oscillator, the output frequency of which is responsive to D-C voltage applied thereto and a saturated mode power amplifier means coupled to said oscillator for amplifying the output of said oscillator, said power switching regulator supplying D-C operating power to said power amplifier means, a voltage regulator having its input connected to said D-C input means and its output connected to said oscillator for providing a constant D-C signal to said oscillator, means for detecting the output current of said A-C output circuit means, means coupling the output of said current detecting means to said voltage regulator for varying the D-C signal thereof in accordance with changes in current to thereby maintain the frequency of the oscillator approximately constant with variations in output current, said power amplifier means including a pair of transistors having their emitters connected together, an input transformer, an output transformer, the transformers and transistors being coupled in a push-pull saturated mode configuration, an additional winding on each end of said output transformer, and a diode connected between each additional winding and a connection between said emitters, said oscillator being coupled to the input transformer and said output transformer being coupled to the A-C output circuit means, a voltage control means having two modes of operation, means responsive to the output of said oscillator and coupled to said voltage control means for causing the same to switch into one mode of operation at the beginning of each half cycle of the output thereof, output detector means responsive to the output voltage of said A-C output circuit means and coupled to said voltage control means for causing the same to be switched into its other mode of operation during each half cycle after a time interval proportional to the output voltage, means coupling the output of said voltage control means to said switching means, the switching means being operated in accordance with said output, and means responsive to the D-C input signal and coupled to said voltage control means for maintaining said voltage control means in its mode of operation which causes said switching means to be turned off when the D-C input signal is below a preselected level and above a preselected level.

12. A static inverter comprising D-C input circuit means for providing a D-C input signal, A-C output circuit means, power switching regulator means connected with said D-C input circuit means and including switching means therein operable for switching on and off the D-C input signal from said D-C input circuit means and filter means converting said switched input into a D-C output signal, said filter means including a series inductor, said switching means including a first and a second transistor, each having a base, an emitter, and a collector, the emitter of said first transistor being coupled to said input circuit means, the base of said first transistor being coupled to the emitter of said second transistor, the collector of said first transistor being coupled to said series inductor, and means coupling the collector of said second transistor to said inductor and including means for reducing the voltage at the collector of said first transistor with respect to the voltage at the collector of said second transistor, means connected with the output of said power switching regulator for converting the output signal thereof into a square wave signal, said converting means being connected with said A-C output circuit means, said converted means including a saturated mode oscillator, the output frequency of which is responsive to D-C voltage applied thereto and a saturated mode power amplifier means coupled to said oscillator for amplifying the output of said oscillator, said power switching regulator supplying D-C operating power to said power amplifier means, a voltage regulator having its input connected to said D-C input means and its output connected to said oscillator for providing a constant D-C signal to said oscillator, means for detecting the output current of said A-C output circuit means, means coupling the output of said current detecting means to said voltage regulator for varying the D-C signal thereof in accordance with changes in current to thereby maintain the frequency of the oscillator approximately constant with variations in output current, said power amplifier means including a pair of transistors having their emitters connected together, an input transformer, an output transformer, the transformers and transistors being coupled in a common emitter push-pull saturated mode configuration, an additional winding on each end of said output transformer, and a diode connected between each additional winding and a connection between said emitters, said oscillator being coupled to the input transformer and said output transformer being coupled to the A-C output circuit means, a voltage control means including a silicon controlled switch, means responsive to the output of said oscillator and coupled to said silicon controlled switch for causing the same to be turned on at the beginning of each half cycle of the output thereof, output detector means responsive to the output voltage of said A-C output circuit means and coupled to said silicon controlled switch for causing the same to be turned off during each half cycle after a time interval proportional to the output voltage, a low voltage transformer having its primary winding coupled to the output of said oscillator, rectifier means coupled to the secondary of said low voltage transformer for providing a turn on polarity voltage and a turn off polarity voltage, means for coupling said turn on polarity voltage to the base of said second transistor when said silicon controlled switch is turned on and said turn off polarity voltage when said silicon controlled switch is turned off, and means responsive to the D-C input signal and coupled to said voltage control means for maintaining said silicon controlled switch turned off when the D-C input signal is below a preselected level and above a preselected level.

References Cited

UNITED STATES PATENTS

| | | | |
|---|---|---|---|
| 2,959,725 | 11/1960 | Younkin | 321—18 |
| 3,124,740 | 3/1964 | Corey et al. | 321—18 XR |
| 3,237,081 | 2/1966 | Martin | 321—18 |
| 3,237,082 | 2/1966 | Heller et al. | 321—18 |
| 3,295,044 | 12/1966 | Pledger et al. | 321—18 |
| 3,320,477 | 5/1967 | Boeker | 321—18 XR |

JOHN F. COUCH, *Primary Examiner.*

W. M. SHOOP, *Assistant Examiner.*